(12) United States Patent
Barnett et al.

(10) Patent No.: US 11,965,611 B2
(45) Date of Patent: Apr. 23, 2024

(54) THREADED PIPE CONNECTIONS WITH IMPROVED LEAK TIGHTNESS

(71) Applicant: United States Steel Corporation, Pittsburgh, PA (US)

(72) Inventors: Alexander Barnett, Houston, TX (US); Chandrashekar Garikapati, Tomball, TX (US); Frederick C. Bennett, Houston, TX (US); Matthew Clatworthy, Houston, TX (US); Keith A. Tuma, Cypress, TX (US)

(73) Assignee: United States Steel Corporation, Pittsburgh, PA (US)

( * ) Notice: Subject to any disclaimer, the term of this patent is extended or adjusted under 35 U.S.C. 154(b) by 37 days.

(21) Appl. No.: 17/533,598

(22) Filed: Nov. 23, 2021

(65) Prior Publication Data

US 2022/0163145 A1 May 26, 2022

Related U.S. Application Data

(60) Provisional application No. 63/117,227, filed on Nov. 23, 2020.

(51) Int. Cl.
*F16L 15/06* (2006.01)
*F16L 15/00* (2006.01)

(52) U.S. Cl.
CPC .............. *F16L 15/06* (2013.01); *F16L 15/001* (2013.01)

(58) Field of Classification Search
CPC ........ F16L 15/06; F16L 15/001; E21B 17/042
See application file for complete search history.

(56) References Cited

U.S. PATENT DOCUMENTS 5,415,442 A    5/1995    Klementich
5,462,315 A    10/1995   Klementich
(Continued)

FOREIGN PATENT DOCUMENTS

EP    0630455 B1    6/1998
JP    6722290 B2    7/2020

OTHER PUBLICATIONS

WEDGE 461, Tenaris, Oct. 29, 2020, https://www.tenaris.com/en/products-and-services/octg/wedge-461.
(Continued)

*Primary Examiner* — David Bochna
(74) *Attorney, Agent, or Firm* — Alan G. Towner; Leech Tishman Fuscaldo & Lampl

(57) ABSTRACT

Provided is a threaded pipe having a pin member connecting to a box member. The pin member contains wedge-shaped pin threads that extends in a helical direction around the outside surface of its pipe end. The pin member is tapered to result in an increasing diameter of the pin threads away from the front end of its pipe. The box member contains a wedge-shaped box thread that stretches in a helical direction around the inside surface of its pipe end. The box member is tapered to result in a decreasing diameter of the box threads away from the front end of its pipe. The pin crest of the pin member increases in width along the pin thread and the box root of the box thread decreases in width along the box thread. When assembled together, the pin thread crest increases in width at a different rate than the box thread root increase in width.

29 Claims, 5 Drawing Sheets

(56) References Cited

U.S. PATENT DOCUMENTS

| | | | |
|---|---|---|---|
| 6,155,613 A * | 12/2000 | Quadflieg | F16L 15/06 |
| | | | 285/334 |
| 6,206,436 B1 * | 3/2001 | Mallis | E21B 17/042 |
| | | | 285/390 |
| 6,722,706 B2 | 4/2004 | Church | |
| 6,976,711 B2 | 12/2005 | Sivley, IV | |
| 7,562,911 B2 | 7/2009 | Reynolds, Jr. et al. | |
| 11,248,725 B2 * | 2/2022 | Maruta | F16L 15/06 |
| 11,560,760 B2 * | 1/2023 | Rueda | E21B 17/042 |
| 2011/0278838 A1 | 11/2011 | Martin et al. | |
| 2012/0074693 A1 * | 3/2012 | Mallis | F16L 15/06 |
| | | | 285/334 |
| 2019/0093799 A1 * | 3/2019 | Sugino | F16L 15/06 |
| 2020/0325734 A1 * | 10/2020 | Langford | E21B 17/042 |
| 2022/0290784 A1 * | 9/2022 | Cordero | F16L 15/06 |

OTHER PUBLICATIONS

WEDGE 463, Tenaris, Oct. 24, 2020, https://www.tenaris.com/en/products-and-services/octg/wedge-463.

VAM Sprong-SF, Vallourec, Sep. 20, 2020, https://solutions.vallourec.com/en/Oil-and-Gas/OCTG/Products/VAM-SPRINT-SF.

WEDGE 441, Tenaris, Oct. 24, 2020, https://www.tenaris.com/en/products-and-services/octg/wedge-441.

TEC-LOCK Wedge, Hunting, Jul. 12, 2020, http://www.hunting-intl.com/connection-technology/semi-premium/tec-lock%E2%84%A2-wedge.

International Search Report dated May 27, 2022 for PCT/US2021/060543.

* cited by examiner

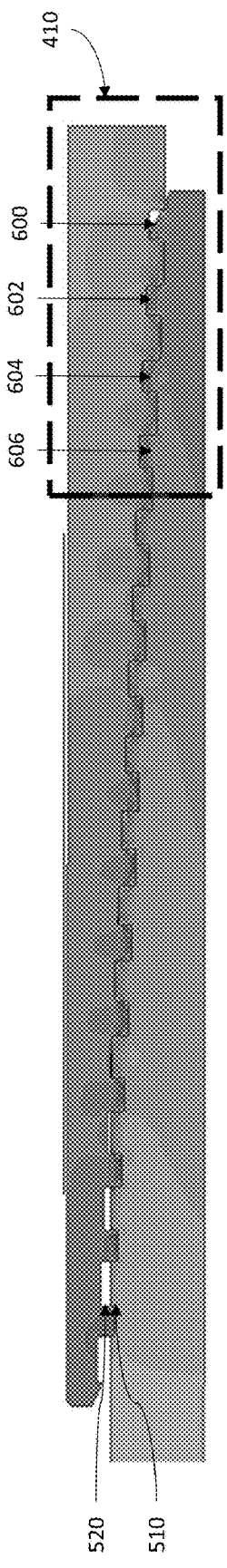
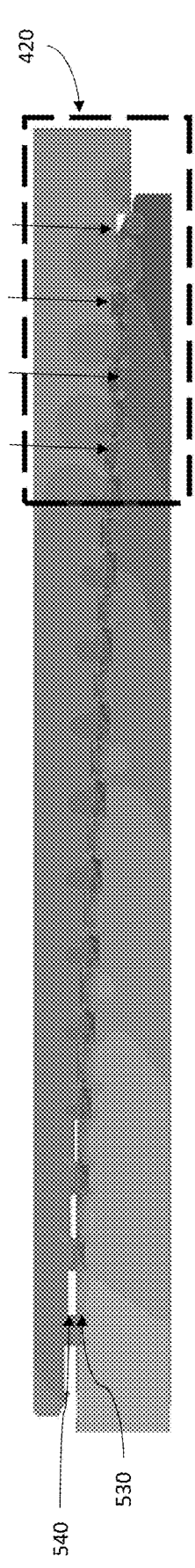
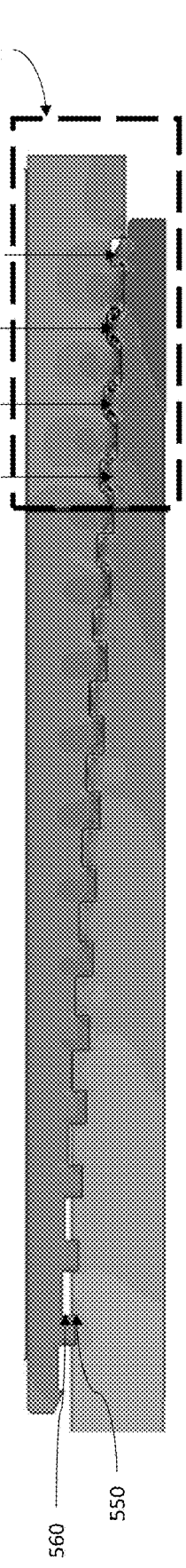
FIG. 3a
FIG. 3b
FIG. 3c

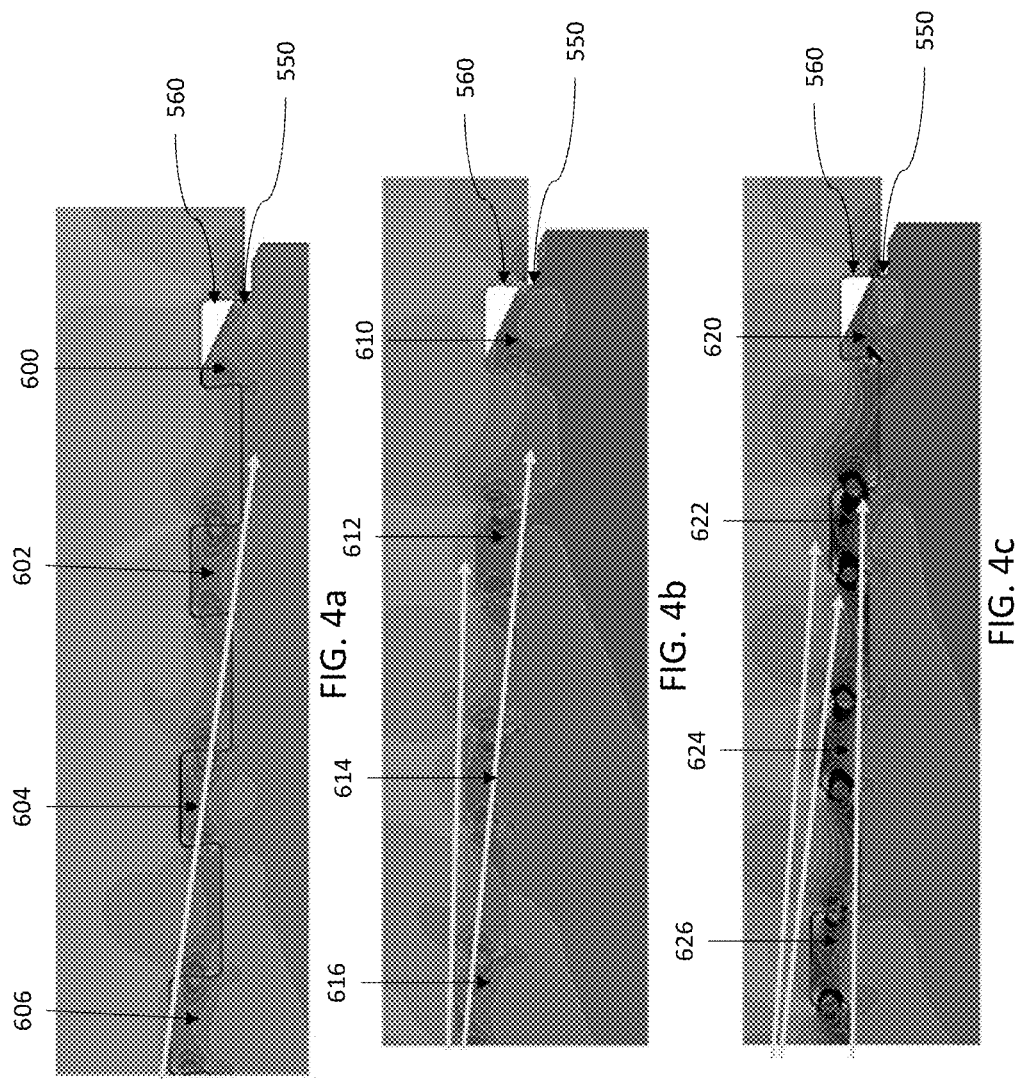

THREADED PIPE CONNECTIONS WITH IMPROVED LEAK TIGHTNESS

CROSS-REFERENCES TO RELATED APPLICATIONS

This application is a non-provisional of and claims priority to U.S. Provisional Patent Application No. 63/117,227 filed on Nov. 23, 2020, which is herein incorporated by reference in its entirety.

FIELD OF THE INVENTION

The present invention relates to threaded pipe connections, and more particularly threaded pipe connections with wedge shapes for improved leak tightness.

BACKGROUND INFORMATION

Threaded pipe connections are used in the oil and gas industry, particularly threaded connections with a wedge thread form such as disclosed in U.S. Pat. No. 6,722,706. Other threaded pipe connections are disclosed in U.S. Pat. Nos. 6,976,711 and 7,562,911, and published U.S. Application No. US2011/0278838. All of the foregoing U.S. patents and applications are incorporated herein by reference.

Threaded connections may include a metal-to-metal seal member to improve sealing ability of the connection or may include soft metal coatings and/or anaerobic thread compounds to improve the sealing ability of the threads on connections without the extra metal-to-metal sealing member. In the absence of a metal-to-metal seal, soft metal coating or a special anaerobic thread compound, such threads typically require relatively high torques to seal and perform as intended, which can result in high localized stress that could detrimentally affect fatigue life. The thread form also has the tendency to trap thread compounds that could contribute to low breakout torques and detrimentally affect performance.

SUMMARY OF THE INVENTION

The present invention provides threaded pipe having a pin member connecting to a box member. The pin member contains wedge-shaped pin threads that extends in a helical direction around the outside surface of its pipe end. The pin member is tapered to result in an increasing diameter of the pin threads away from the front end of its pipe. The box member contains a wedge-shaped box thread that stretches in a helical direction around the inside surface of its pipe end. The box member is tapered to result in a decreasing diameter of the box threads away from the front end of its pipe. The pin crest of the pin member increases in width along the pin thread and the box root of the box thread decreases in width along the box thread. When assembled together, the pin thread crest increases in width at a different rate than the box thread root increase in width.

An aspect of the present invention is to provide a threaded connection comprising a first tubular component comprising a pin thread extending in a helical direction around the first tubular component along a longitudinal axis from the first tubular component front surface towards the first tubular component back surface opposite the first tubular component front surface, and a second tubular component comprising a box thread extending in a helical direction around the second tubular component along the longitudinal axis from the second tubular component front surface towards the second tubular component back surface opposite the second tubular component front surface and structured and arranged to connect to the first tubular component. The pin thread is tapered at a pin taper angle between a portion of the first tubular component between the first tubular component front surface and the first tubular component back surface. The box thread is tapered at a box taper angle between a portion of the second tubular component between the second tubular component front surface and the second tubular component back surface. The box taper angle is different than the pin taper angle. The width of the crest of the pin thread changes at a crest width rate along at least a portion of the pin thread between a start of the pin thread and the end of the pin thread. A width of the root of the box thread changes at a root width rate along at least a portion of the box thread between a start of the box thread and the end of the box thread. The box thread root width rate of change is different than the pin thread crest width rate of change.

Another aspect of the present invention is to provide a first pipe end comprising a pin thread extending in a helical direction around the first end along a longitudinal axis from a first end front surface towards a first end back surface opposite the first end front surface. The pin thread is tapered at a pin taper angle between a portion of the first end between the first end front surface and the first end back surface. A width of the crest of the pin thread changes at a pin crest width rate of change along at least a portion of the pin thread between a start of the pin thread and an end of the pin thread. The first end is structured and arranged to connect with a second end of a second pipe. The second end comprises a box thread extending in a helical direction around the second end along the longitudinal axis from a second end front surface towards a second end back surface opposite the second end front surface and structured and arranged to connect to the first end. The box thread is tapered at a box taper angle between a portion of the first end between the first end front surface and the first end back surface. The box taper angle is different than the pin taper angle. A width of the root of the box thread changes at a box root width rate of change along at least a portion of the box thread between a start of the box thread and an end of the box thread. The box root width rate of change is different than the pin crest width rate of change.

A further aspect of the present invention is to provide a threaded pipe comprising a first end comprising a box thread extending in a helical direction around the first end along a longitudinal axis from a first end front surface towards a first end back surface opposite the first end front surface. The box thread is tapered at a box taper angle between a portion of the first end between the first end front surface and the first end back surface. A width of the root of the box thread changes at a box root width rate of change along at least a portion of the box thread between a start of the box thread and an end of the box thread. The first end is structured and arranged to connect with a second end of a second pipe. The second end comprises a pin thread extending in a helical direction around the second end along the longitudinal axis from a second end front surface towards a second end back surface opposite the second end front surface and structured and arranged to connect to the first end. The pin thread is tapered at a pin taper angle between a portion of the first end between the first end front surface and the first end back surface. The pin taper angle is different than the box taper angle. A width of the crest of the pin thread changes at a pin crest width rate of change along at least a portion of the pin thread between a start of the pin thread and an end of the pin thread. The pin crest width rate of change is different than the box root width rate of change.

These and other aspects of the present invention will be more apparent from the following description.

BRIEF DESCRIPTION OF DRAWINGS

FIGS. 3a-3c show stress concentrations in three different threaded pipe connection configurations. Minimal root crest stresses are shown for a nominal taper (FIG. 3a); root crest stresses in threads close to the pin nose are shown for a biased taper configuration (FIG. 3b); and root crest stresses plus concentrated flank loading on the first few threads is shown for a biased thread width rate of change in accordance with an embodiment of the present invention (FIG. 3c).

FIGS. 4a-4c include magnified pin nose portions of the threaded pipe connection configurations shown in FIGS. 3a-3c.

DETAILED DESCRIPTION

Figure 1:
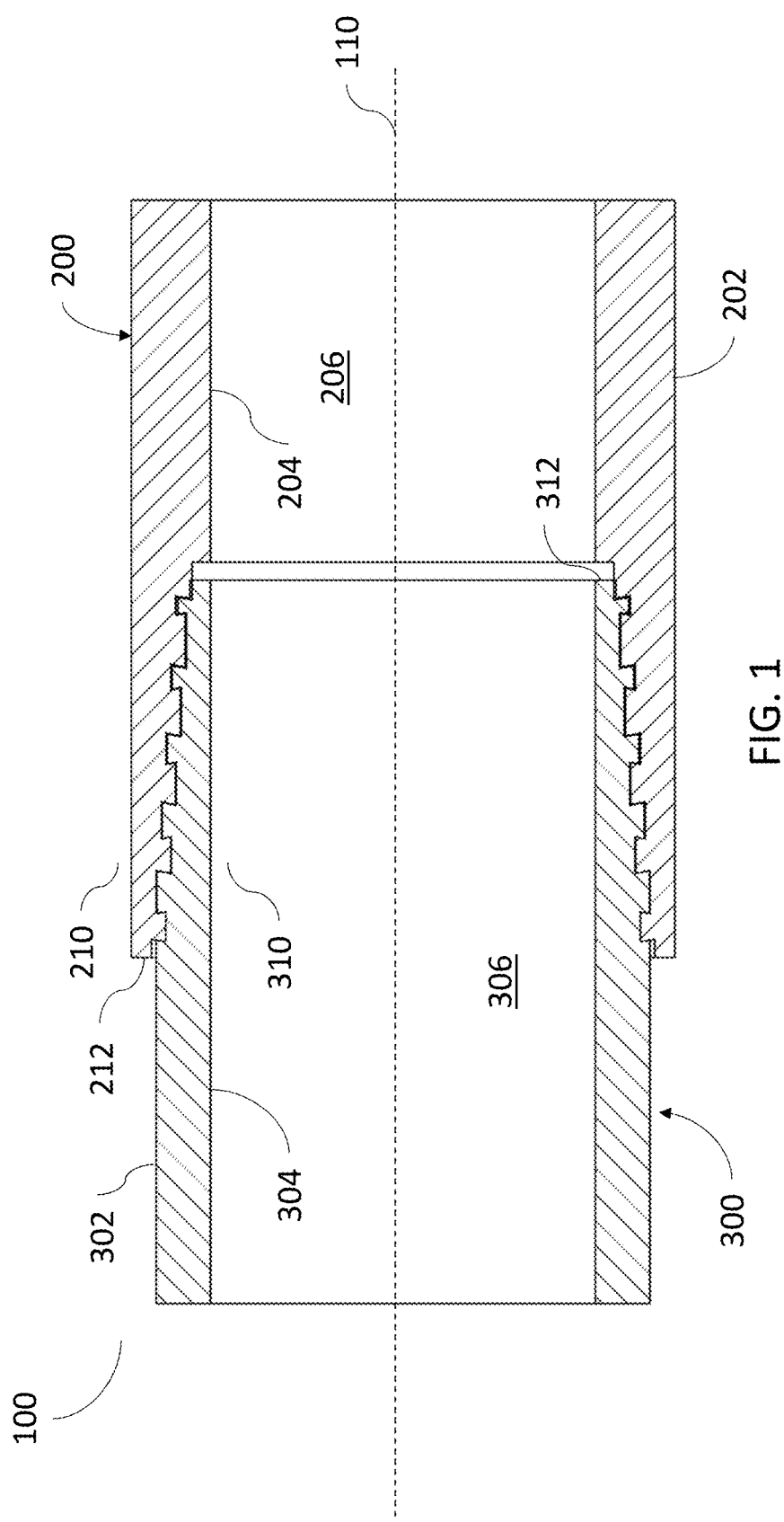
FIG. 1 is a side sectional view of a coupling of a box (female) and pin (male) members of two threaded pipes in accordance with an embodiment of the present invention.

The threaded pipe connections of the present invention improves the sealing ability of threaded connections with a wedge thread form without the need for an extra metal-to-metal sealing member or the need for special coatings or special thread compounds. The thread elements are modified to provide better sealing ability for the threads closer to the pin nose thus improving the sealing performance of the threaded connection that is exposed to pressures inside the pipe. In addition to improving the sealing ability, the present threaded pipe connections reduce localized stresses in the critical pin threads that are susceptible to fatigue failures. The same principle can be used to improve the sealing ability of the threads closer to the box face, thus improving the sealing performance of the threaded connection that is exposed to pressures outside the pipe. The modified thread features also facilitate a controlled evacuation of the thread compound thus reducing the possibility of trapping the thread compound and associated issues that could result. It also improves the breakout torque of the connection significantly, allowing for the connection to perform as expected at torques low enough to accommodate the limitations of some buck-on machines and high enough for the critical high torque applications. A combination of these principles can be used to improve sealing ability of the threads closer to the pin nose and closer to the box face to improve sealing performance of the threaded connection that is exposed to both external and internal pressures.

There has been an increased demand for threaded connections to have better liquid and gas sealing capabilities, higher operational torque capacity and better fatigue performance, while remaining inexpensive to manufacture and capable of performing at make-up torques that are low enough to accommodate the torque limitations of easily accessible buck-on units. The threaded pipe connections of the present invention meet these requirements by incorporating the following:

The threaded pipe connections of the present invention are able to meet these requirements by at least incorporating a wedge thread. The wedging action of the assembled threads enables greater torque capacity that will provide operators with higher torque to use in order to get out of tight spots while installing casing in extended reach horizontal shale wells.

The threaded pipe connections of the present invention are also able to meet these requirements by at least incorporating different thread leads. The different leads between the male member, i.e., the pin, and the female member, i.e., the box, ensure that the threads near to the pin nose are more engaged than all of the other threads. Higher strains are provided in the threads near the pin nose and gaps in the thread form are ultimately filled, thus providing a greater gas and liquid leak tightness at relatively lower torques while not losing the functionality at high operational torque capacity.

The threaded pipe connections of the present invention are able to meet these requirements by at least incorporating different thread tapers. The taper combinations enable higher thread interference toward the pin nose, resulting in high contact stresses near the pin nose that improve sealing ability and lower stresses closer to the coupling ends, thus improving the fatigue life.

The combined features of the threaded pipe connections help in applications where high torque is needed, reasonable gas tightness is expected, 100% axial efficiencies are required, and tight clearances.

The present invention may include threaded and assembled connections, integral upset threaded connections, and integral threaded connections where the box/coupling thread crest diameter is at or below the pin thread root diameter at first full form pin thread that is fully engaged with box threads.

When the threaded connections are assembled, the changing width of the pin threads is less than the changing width of the box threads. The difference between the change in thread width results in strains that do not compromise performance. The taper of the pin threads is less than the taper of the box threads which also results in strains that do not compromise performance.

Configuration limits are applicable to threads with wedging action and have dovetail or faceted dovetail thread forms, with or without adjacent metal to metal seals.

Figure 2:
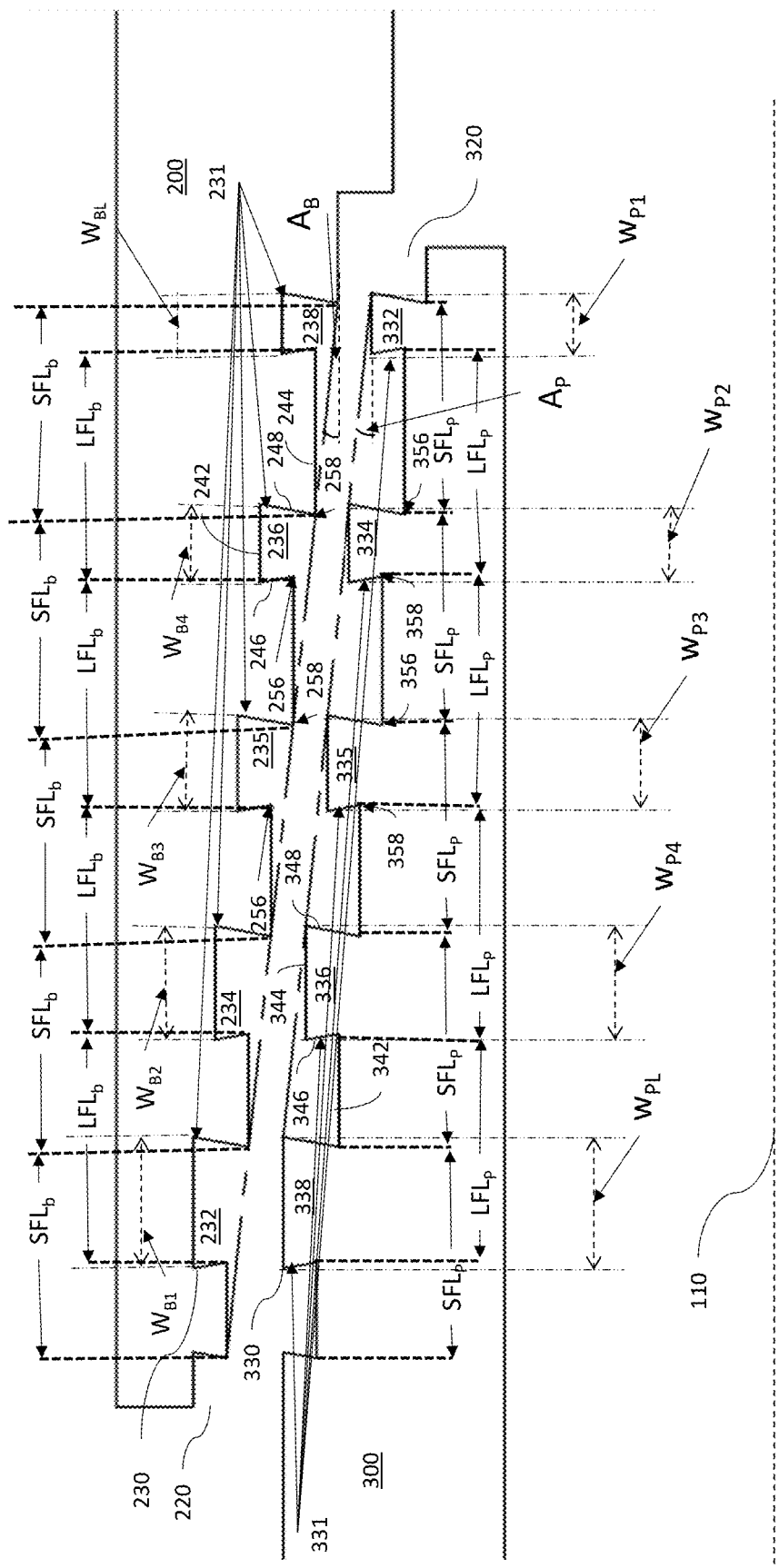
FIG. 2 is a side sectional view of box (female) and pin (male) members of a threaded pipe connection with improved leak tightness in accordance with an embodiment of the present invention.

FIGS. 1 and 2 illustrate box and pin members of a threaded pipe connection with improved leak tightness in accordance with an embodiment of the present invention. Features of the upper box/female member and lower pin/male member shown in FIG. 1 and geometric parameters or constraints associated with the features are controlled in order to increase leak tightness. As used herein, the term "load flank" means the sidewall of a thread that faces away from the outer end from the respective male or female member on which the thread is formed. The term "stab flank" means the sidewall surface that faces toward the outer end of the respective male or female member and supports the weight of the joint during the initial assembly of the members.

The threaded pipe connections of the present invention shown in FIGS. 1 and 2, provide improved leak tightness due to tighter interaction between the pin and box at the first engaged pin thread close to the inner diameter of the box member. Sealing performance for internal pressure is improved when the first thread is tighter in contact than the other threads in the made-up position.

With reference to FIG. 1, shown is a threaded connection 100 between two pipe ends. The threaded connection 100 results in a connection between the first pipe 200, which includes a female pipe connection fitting 210, and the second pipe 300, which includes a male pipe connection fitting 310. The pipes 200, 300 may be tubular in shape, having pipe outer diameters 202, 302, and pipe inner diameters 204, 304. The pipe inner diameters 204, 304 may enclose the pipe flow path 206, 306, which allows a fluid, such as a liquid or gas, to travel through the center of the pipes 200, 300.

Referring to FIGS. 1 and 2, the female pipe connection fitting 210 includes box threads 220 that are arranged on the inside surface of the first pipe 200. The box threads 220 may include a box thread groove 230 that rotates about the inner surface of the first pipe 200 in a helical direction from the first pipe end surface 212 in the longitudinal direction along the longitudinal axis 110 towards the opposite end of the first pipe 200. An individual box thread 231 is one full rotation of the box thread groove 230 around the inside surface of the first pipe 300. The box threads 220 include each individual box thread 231 on the female pipe connection fitting 210.

Referring to FIGS. 1 and 2, the male pipe connection fitting 310 includes pin threads 320 that is arranged on the outside surface of the second pipe 300. The pin threads 320 may include a pin thread tooth 330 that rotates about the outer surface of the second pipe 300 in a helical direction from the second pipe end surface 312 in the longitudinal direction along the longitudinal axis 110 towards the opposite end of the second pipe 300. An individual pin thread 331 is one full rotation of the pin thread tooth 330 around the outside surface of the second pipe 300. The pin threads 320 include each pin thread 331 on the male pipe connection fitting 310.

Referring now to FIG. 2, in some non-limiting embodiments or aspects, when viewing the cross-sectional view of the female pipe connection fitting 210, a series of individual box threads 231 can be seen, including a first box thread 232, second box thread 234, middle box thread 235, second-to-last box thread 236, and a last box thread 238. The number of individual box threads 231 that can be viewed in the cross-sectional view may be dependent on the number of full rotations that the box thread groove 230 completes through the length of the box threads 220. For example, if the box thread groove 230 completes five full rotations throughout the length of the box threads 220, five individual box threads 231 may be visible in a cross-sectional view of the female pipe connection fitting 210. Less than five full rotations or more than five full rotations is also possible throughout the length of the box threads 220, resulting in less than five or more than five box individual threads 231 being visible in the cross-sectional view.

The box thread groove 230 may include a box root 242, a box crest 244, a box load flank 246, and a box stab flank 248. The box root 242 is the surface closest to the outside diameter of the first pipe 200. The box threads 220 on the female pipe connection fitting 210 is tapered inwardly radially such that the diameter of the box threads 220 is larger at the first pipe end surface 212 and becomes smaller in the direction along the longitudinal axis 110 towards the opposite end of the first pipe 200. As shown in FIG. 2, the box threads 220 has a box taper angle $A_B$ measured from the longitudinal axis 110 of the pipe. The box taper angle $A_B$ may typically range from 0.1° to 10°, for example, from 1.5° to 5°. The box taper angle $A_B$ may typically be at least 0.1°, or at least 0.5°, or at least 1°.

The box taper angle $A_B$ may be constant through the box threads 220, resulting in a straight line across each individual box thread 231. In some non-limiting embodiments or aspects, the box taper angle $A_B$ may change across the box threads 220, resulting in the individual box threads 231 forming a concave or convex curve across the box threads 220 of the female pipe connection fitting 210. In some non-limiting embodiments or aspects, the box taper angle $A_B$ change across the box threads resulting in some combination of linear, convex, and/or concave curves across the box threads 220.

As the box thread groove 230 spirals along the female pipe connection fitting 210 along the longitudinal axis 110, the diameter of the box root 242 may decrease for at least a portion of the box thread groove 230 along the taper of the female pipe connection fitting 210. A decreased diameter of the box root 242 will result in an increase in the pipe wall thickness at that point of the box thread groove 230 compared to another point of the box thread groove 230 with a larger diameter of the box root 242.

The box stab flank 248 is the side surface of the box thread groove 230 facing the first pipe end surface 212. The box stab flank edge 258 is the outer edge of the box thread groove 230 on the box stab flank 248. The distance between two adjacent box stab flank edges 258 in the same cross-sectional view along the longitudinal axis 110 is the box stab flank lead $SFL_b$. The box stab flank lead $SFL_b$ may be equal or substantially equal through at least a portion of the box thread groove 230. The box stab flank leads $SFL_b$ in a cross-sectional view of the first pipe 200 along the longitudinal axis 110 may remain constant or substantially constant throughout the entire box thread groove 230. For example, the box stab flank lead $SFL_b$ of the first box thread 232 and the box stab flank lead $SFL_b$ of the second box thread 234 may be equal or substantially equal to the box stab flank lead $SFL_b$ of the second to last box thread 236 and the box stab flank lead $SFL_b$ of the last box thread 238.

The box load flank 246 is the side surface of the box thread groove 230 facing away from the first pipe end surface 212. The box load flank edge 256 is the outer edge of the box thread groove 230 on the box load flank 246. The distance between two adjacent box load flank edges 256 in the same cross-sectional view along the longitudinal axis 110 is the box load flank lead $LFL_B$. The box load flank lead $LFL_B$ may be equal or substantially equal through at least a portion of the box thread groove 230. The box load flank leads $LFL_b$ in a cross-sectional view of the first pipe 200 along the longitudinal axis 110 may remain constant or substantially constant throughout the entire box thread groove 230. For example, the distance between the box load flank lead $LFL_B$ of the first box thread 232 and the box load flank lead $LFL_B$ of the second box thread 234 may be equal or substantially equal to the box load flank lead $LFL_B$ of the second to last box thread 236 and the box load flank lead $LFL_B$ of the last box thread 238.

The box crest 244 is the surface of the box threads 220 outside of the box thread groove 230, between the box stab flank edge 258 of one box thread 231 and the box load flank edge 256 of the adjacent box thread 231.

The box stab flank 248 and/or box load flank 246 may be angled to create a dovetail shape of the box thread groove 230, such that the box root 242 is wider than the horizontal distance between the box stab flank edge 258 and the box load flank edge 256 of the same box thread 231.

The box roots 242 of the box threads 220 may decrease in width in the longitudinal direction from the first pipe end surface 212 and the opposite end of the second pipe in the longitudinal direction along the longitudinal axis 110. As shown in FIG. 2, the width of the root of the box is represented by $W_{BN}$, where N is the number of the box starting with the width of the root of the first box $W_{B1}$ to the width of the root of the last box $W_{BL}$. For example, $W_{B2}$ represents the width of the root of the second box, $W_{B3}$ represents the width of the root of the third box, and $W_{B4}$ represents the width of the root of the fourth box. The rate of change of the width of the box threads 220 may typically have $W_{BL}$ being 80% less than $W_{B1}$, for example, 75% or less, or 50% or less. The rate of the change of the width of the box threads 220 may result in the width of the root of the last box $W_{BL}$ being less than the width of the root of the first box $WB_1$. Each subsequent box root of the box may be thinner than the previous box root. For example, $W_{B1}>W_{B2}>W_{B3}>W_{B4}> \ldots >W_{BL}$. The rate of change of the width of the box roots 242 may be constant throughout the box threads 220. In some non-limiting embodiments or aspects, the rate of change of the width of the box roots 242 may be variable throughout the box threads 220, e.g., an increasing rate and/or decreasing rate of change of the width of the box roots 242. In some non-limiting embodiments or aspects, the rate of change of the width of the box roots 242 is 0 through a portion of the box threads 220, resulting in a constant width of the box roots 242 through a portion of the box thread threads. For example, $W_{B1}>W_{B2}=W_{B3}=W_{B4}> \ldots >W_{BL}$ or $W_{B1}>W_{B2}>W_{B3}=W_{B4}= \ldots =W_{BL}$.

With continued reference to FIG. 2, in some non-limiting embodiments or aspects, when viewing the cross-sectional view of the male pipe connection fitting 310, a series of individual pin threads 331 can be seen, including a first pin thread 332, second pin thread 334, middle pin thread 335, second-to-last pin thread 336, and a last pin thread 338. The number of individual pin threads 331 that can be viewed in the cross-sectional view may be dependent on the number of full rotations that the pin thread tooth 330 completes through the length of the pin threads 320. For example, if the pin thread tooth 330 completes five full rotations throughout the length of the pin threads 320, five individual pin threads 331 may be visible in a cross-sectional view of the male pipe connection fitting 310. Less than five full rotations or more than five full rotations is also possible throughout the length of the pin threads 320, resulting in less than five or more than five individual pin threads 331 being visible in the cross-sectional view.

The pin thread tooth 330 may include a pin root 342, a pin crest 344, a pin load flank 346, and a pin stab flank 348. The pin root 342 is the surface closest to the outside diameter of the second pipe 300. The pin threads 320 on the male pipe connection fitting 310 is tapered outwardly radially such that the diameter of the pin threads 320 is smaller at the second pipe end surface 312 and becomes larger in the direction along the longitudinal axis 110 towards the opposite end of the second pipe 300. As shown in FIG. 2, the pin 331 has a pin taper angle $A_P$ measured from the longitudinal axis 110 of the pipe. The pin taper angle $A_P$ may typically range from 0° to 10°, for example, from 1.5° to 5°, or from 2° to 3°. The pin taper angle $A_P$ may be at least 0.1°, or at least 0.5°, or at least 1°.

The pin taper angle $A_P$ may be constant through the pin threads 320, resulting in a straight line across each individual pin thread 331. In some non-limiting embodiments or aspects, the pin taper angle $A_P$ may change across the pin threads 320, resulting in the individual pin threads 331 forming a concave or convex curve across the pin threads 320 of the male pipe connection fitting 310. In some non-limiting embodiments or aspects, the box taper angle $A_B$ change across the box threads resulting in some combination of linear, convex, and/or concave curves across the box threads 220.

The pin stab flank 348 is the side surface of the pin thread tooth 330 facing the second pipe end surface 312. The pin stab flank edge 358 is the outer edge of the pin root 342 on the pin stab flank 348. The distance between two adjacent pin stab flank edges 358 in the same cross-sectional view along the longitudinal axis 110 is the pin stab flank lead $SFL_P$. The pin stab flank lead $SFL_P$ may be equal or substantially equal through at least a portion of the pin thread tooth 330. The two adjacent pin stab flank leads $SFL_P$ in a cross-sectional view of the second pipe 300 along the longitudinal axis 110 may remain constant or substantially constant throughout the entire pin thread tooth 330. For example, the pin stab flank lead $SFL_P$ of the first pin thread 332 and the pin stab flank lead $SFL_P$ of the second pin thread 334 may be equal or substantially equal to the pin stab flank lead $SFL_P$ of the second to last pin thread 336 and the pin stab flank lead $SFL_P$ of the last pin thread 338. The pin stab flank leads $SFL_P$ in a cross-sectional view of the second pipe 300 along the longitudinal axis 110 may be less than or greater than the box stab flank leads $SFL_B$ in a cross-sectional view of the first pipe 200 along the longitudinal axis 110.

The pin load flank 346 is the side surface of the pin thread tooth 330 facing away from the second pipe end surface 312. The pin load flank edge 356 is the outer edge of the pin root 342 on the pin load flank 346. The distance between two adjacent pin load flank edges 356 in the same cross-sectional view along the longitudinal axis 110 is the pin load flank lead $LFL_P$. The pin load flank lead $LFL_P$ may be equal or substantially equal through at least a portion of the pin thread tooth 330. The two adjacent pin load flank leads $LFL_P$ in a cross-sectional view of the second pipe 300 along the longitudinal axis 110 may remain constant or substantially constant throughout the entire pin thread tooth 330. For example, the pin load flank lead $LFL_P$ of the first pin thread 332 and the pin load flank lead $LFL_P$ of the second pin thread 334 may be equal or substantially equal to the pin load flank lead $LFL_P$ of the second to last pin thread 336 and the pin load flank lead $LFL_P$ of the last pin thread 338. The load flank leads $LFL_P$ in a cross-sectional view of the second pipe 300 along the longitudinal axis 110 may be greater or less than the box load flank leads $LFL_B$ in a cross-sectional view of the first pipe 200 along the longitudinal axis 110.

The pin crest 344 is the outer surface of the pin threads 320 at the tip of the individual pin thread 331 along the pin thread tooth 330.

The pin stab flank 348 and pin load flank 346 may be angled to create a dovetail shape of the pin thread tooth 330, such that the pin root 342 is wider than the horizontal distance between the two pin crests 344 of the adjacent individual pin threads 331 of the pin thread tooth 330.

The crests 344 of the pin thread 320 may increase in width in the longitudinal direction from the second pipe end surface 312 and the opposite end of the second pipe in the longitudinal direction along the longitudinal axis 110. As shown in FIG. 2, the width of the crest of the pin is represented by $W_{PN}$, where N is the number of the pin starting with the width of the crest of the first pin $W_{P1}$ to the width of the crest of the last pin $W_{PL}$. For example, $W_{P2}$ represents the width of the crest of the second pin, $W_{P3}$ represents the width of the crest of the third pin, and $W_{P4}$ represents the width of the crest of the fourth pin. The rate of change of the width of the pin threads 320 may typically have $W_{P1}$ being 80% less than $W_{PL}$, for example, 75% or less, or 50% or less. The rate of change of the width of the pin crests may be constant throughout the pin threads 320. In some non-limiting embodiments or aspects, the rate of change of the width of the pin crests may be variable throughout the pin threads 320, e.g., an increasing rate and/or decreasing rate of change of the width of the pin crests. In some non-limiting embodiments or aspects, the rate of change of the width of the pin crests is 0 through a portion of the pin thread 320, resulting in a constant width of the pin crests 344 through a portion of the pin thread 320. For example, $W_{PL} > \ldots > W_{P4} = W_{P3} = W_{P2} > W_{P1}$ or $W_{PL} = \ldots = W_{P4} = W_{P3} > W_{P4} > W_{P1}$.

The box threads 220 is configured to receive the pin threads 320 in order to create an assembly of the first pipe 200 and the second pipe 300. The assembly may be liquid tight and/or gas tight, resulting in minimal to no leakage. The assembly may be achieved through lower torques, such as those achieved through typical tools, such as buck-on units, for connecting pipe ends (e.g., 5,000 ft-lbs to 50,000 ft-lbs).

The assembly may allow for minimal use of thread compound (e.g., dope) during the connection of the two pipes. As the pipe ends are assembled, the threads may allow the thread compound to be squeezed towards one end of the assembly, instead of trapping the thread compound at various points throughout the connection. This allows for less thread compound to be used for the assembly. The assembly may be made with or without a metal-to-metal sealing member between the two pipes.

The taper of the first pipe 200 and the taper of the second pipe 300 may be biased such that the portion of the box threads 220 that first comes in contact and engages with a portion of the pin threads 320 occurs at the portion of pin threads 320 that is closer to the inner diameter of the coupling (e.g., closer to the second pipe end surface 312). This creates a radial engagement of the coupling. The box taper angle $A_B$ may be different than the pin taper angle $A_P$. The box taper angel $A_B$ may be greater than the pin angle $A_P$. The pin taper angle $A_P$ is typically at least 2° less than the box taper angle $A_B$. For example, the pin taper angle $A_P$ may be at least 1° less than the box taper angle $A_B$, or at least 0.5° less than the box taper angle $A_B$. In some non-limiting embodiments or aspects, the box taper angle $A_B$ may be less than the pin taper angle $A_P$ to bias the engagement in the opposite direction. In some non-limiting embodiments or aspects, the pin taper angle $A_P$ may be 0° and the box taper angle $A_B$ may be greater than or less than the pin taper angle $A_P$. In some non-limiting embodiments or aspects, the box taper angle $A_B$ may be 0° and the pin taper angle $A_P$ may be greater than or less than the box taper angle $A_B$.

The change of width of the box threads 220 and/or pin threads 320 may be biased such that the width of the root of the last box $WB_L$ is thinner than the width of the crest of the first pin $W_{P1}$. The box stab flank leads $SFL_b$ may be less than the pin stab flank leads $SFL_P$. In some non-limiting embodiments or aspects, the box stab flank leads $SFL_b$ may be greater than or equal to the pin stab flank leads $SFL_P$. The box load flank leads $LFL_b$ may be greater than pin load flank leads $LFL_P$. In some non-limiting embodiments or aspects, the box load flank leads $LFL_b$ may be less than or equal to the pin load flank leads $LFL_P$.

The rate of the change of width of the box root 242 of the box threads 220 may be different than the rate of the change of width of the pin crest 344 of the pin threads 320. The box root 242 of the box threads 220 may widen at a faster rate along the helical direction of the box threads 220 towards the first pipe front face 212 than the pin crest 344 widens along the helical direction of the pin threads 320 away from the second pipe front face 312. When assembled, the difference in the rate of changes of the widths of the box roots and the pin crests may cause the pins to become less tight against the boxes in the direction away from the second pipe front face 312. The difference between the width of the box roots and the width of the pin crests may then increase between the second pipe end surface 312 and first pipe end surface 212. For example, $W_{B1} - W_{PL} > \ldots > W_{B2} - W_{P4} > W_{B3} - W_{P3} > W_{B4} - W_{P2} > W_{BL} - W_{P1}$. The rate of change of the width of the box root 242 of the box threads 220 may range from 0% to 10% greater than the rate of change of the width of the pin crest 344 of the pin threads 320, for example from 0.5% to 5%. The rate of change of the width of the box root 242 of the box threads 220 may be at least 0.1% greater than the rate of change of the width of the pin crest 344 of the pin threads 320, for example, at least 0.5%, or at least 1%.

The rate of change of the width of the pin crest 344 of the pin threads 320 may be constant throughout the length of the pin threads 320, or for only a portion of the pin threads 320. The rate of change of the width of the box seat 242 of the box threads 220 may be constant throughout the length of the box threads 220, or for only a portion of the box threads 220. In some non-limiting embodiments or aspects, the rate of change of the widths may be equal for a portion of the box threads 220 and pin threads 320. For example, $W_{B1} - W_{PL} > \ldots > W_{B2} - W_{P4} = W_{B3} - W_{P3} = W_{B4} - W_{P2} > W_{BL} - W_{P1}$. In some non-limiting embodiments or aspects, the rate of widening of the box seat 242 may be less than the rate of the increase in width of the pin crest 344.

The taper bias and the width bias may concentrate the force of the coupling on the load flank surfaces 246, 346, and/or the stab flank surfaces 258, 358. The biases may ensure that the first pin thread 332 is the first pin to come in contact with the box threads 220 during the rotation of the piping during the coupling process. The second pin thread 334 and each subsequent pin may then come in contact with the box threads 220 in an ordered and controlled manner.

Once assembled, the connection of the first pipe 200 and the second pipe 300 may be capable of withstanding extremely high torques.

A pipe may have box threads 220 on one end of the pipe and pin threads 320 on the opposite end of the pipe, box threads 220 on both ends of the pipe, or pin threads 320 on both ends of the pipe.

FIGS. 3a-3c and 4a-4c show stress concentrations in three different threaded pipe connection configurations. Darker shading in FIGS. 3a-3c and 4a-4c represent increased stresses. Greater stresses indicate greater leak-tight properties of the coupling.

Shown in FIG. 3a is pin threads 510 connected with box threads 520 with nominal tapering of the threads, which results in minimal root crest stresses. The minimal root crest stresses can be seen at the tip portion 410 of the pin threads 510, as magnified in FIG. 4a. The shading around the first pin thread 602, second pin thread 604, and third pin thread 606 are not significantly darker than the shading around the opposite end of the pin threads 510. It is noted that the chamfer 600 is not considered as a pin thread for this analysis.

Shown in FIG. 3b is a pin thread 530 connected with box threads 540 with a biased tapering, which results in increased root crest stresses. The increased root crest stress can be seen at the tip portion 420 of the pin threads 530, as magnified in FIG. 4b. The shading around the first pin thread 612 shows much darker shading around the first pin thread 612 indicating increased stresses than compared to the first pin thread 602 of the nominal tapering. The stresses for the second pin thread 614 and third pin thread 616 show a decreasing stress in subsequent pins, but the stress still remain higher than the stress of this pins associated with the nominal tapering. As with FIG. 3a, the chamfer 610 is not considered as a pin for this analysis.

Shown in FIG. 3c is pin threads 550 connected with box threads 560 with a biased taper as well as a concentrated flank loading on the first few pin threads, which results in significantly increased root crest stress compared to the biased tapering alone. The increased root crest stress can be seen at the tip portion 430 of the pin threads 550, as magnified in FIG. 4c. The shading around the first pin thread 622 shows a highly concentrated stress on the sides of the first pin thread 622. This highly concentrated stress is still present in the second pin thread 624, third pin thread 626, and subsequent pins, although the stress is decreased in each subsequent pin thread after the first pin thread 622. As also shown in FIG. 3c, the stress in the individual pin threads at the tip portion 430 is significantly higher than the stress in the individual pin threads at the back end of the pin threads 550. As with FIGS. 3a and 3b, the chamfer 620 is not considered as a pin for this analysis.

Figure 5:
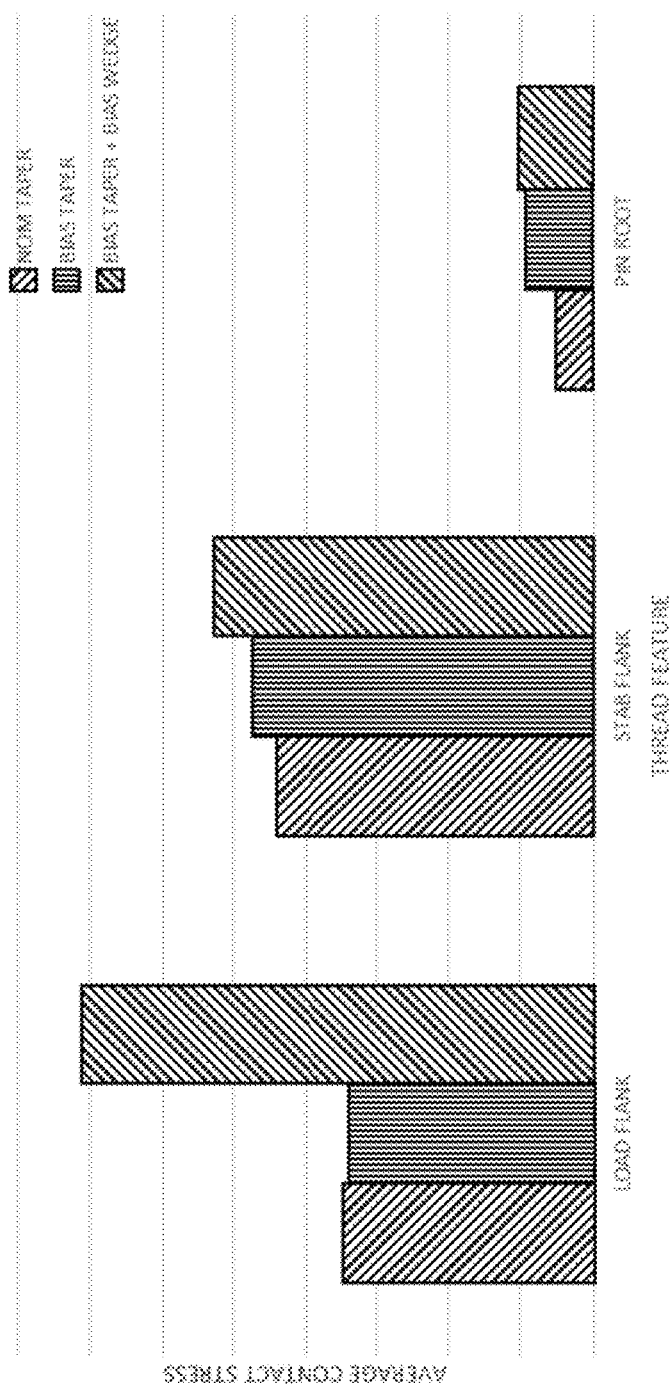
FIG. 5 includes finite element analysis graphs showing average contact stresses at the load flank, stab flank, and pin root for the three different types of threaded connections shown in FIGS. 3a-3c and 4a-4c for various thread features.

FIG. 5 includes finite element analysis graphs showing average contact stresses at the load flank, stab flank and pin root for the three different types of threaded connections shown in FIGS. 3a-3c and 4a-4c for various thread features. The finite element analysis demonstrates that the improvement in contact stress in the load flank, stab flank and the roots and/or crest of the threads as you introduce a biased taper and a bias wedge. The improvement in the contact stress directly relates to improvement of the sealing ability of the threads.

The pipe sections and threaded pipe connections of the present invention may be made from suitable materials known to those skilled in the art. For example, the pipe sections and connections may conform with National Association of Corrosion Engineers (NACE) standards, and may include corrosion resistant alloys (CRAs). Typical examples of CRA materials include stainless steel, austenitic steel, high alloy austenitic steel, martensitic steel, precipitation hardened steel, dual-phase steel, ferritic steel, polyvinyl chloride (PVC), polymer pipe materials, and/or the like.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application and the appended claims, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention.

What is claimed is:

1. A threaded connection comprising:
   a first tubular component comprising at least one pin thread extending in a helical direction around the first tubular component along a longitudinal axis from a first tubular component front surface towards a first tubular component back surface opposite the first tubular component front surface, each of the pin threads includes a pin crest width, a pin stab flank and a pin load flank, the pin crest width changes at a pin crest width rate of change; and
   a second tubular component comprising at least one box thread extending in a helical direction around the second tubular component along the longitudinal axis from a second tubular component front surface towards a second tubular component back surface opposite the second tubular component front surface and structured and arranged to connect to the first tubular component, each of the box threads includes a box root width, a box stab flank and a box load flank, the box root width changes at a box root width rate of change, wherein the box root width rate of change is different than the pin crest width rate of change;
   wherein the pin crest width is greater than the box root width forming a width bias;
   wherein the at least one pin thread is tapered at a pin taper angle;
   wherein the at least one box thread is tapered at a box taper angle;
   wherein the box taper angle is different than the pin taper angle forming a taper angle bias;
   wherein the taper angle bias and the width bias are configured to concentrate stress on the pin load flank, box load flank, pin stab flank and the box stab flank, the stress decreasing along the threaded connection from the first tubular component front surface towards the first tubular component back surface; and
   wherein the taper angle bias and the width bias are configured to orient the first tubular component such that a pin thread adjacent the first tubular component front surface is first to engage the box threads during the rotation for the threaded connection and each subsequent pin thread engages the box threads in an ordered and controlled manner.

2. The threaded connection of claim 1, wherein the pin taper angle is at least 2° less than the box taper angle.

3. The threaded connection of claim 1, wherein the pin taper angle is at least 1° less than the box taper angle.

4. The threaded connection of claim 1, wherein the root width rate is at least 10% greater than the pin width rate.

5. The threaded connection of claim 1, wherein the root width rate is at least 5% greater than the pin width rate.

6. The threaded connection of claim 1, wherein the width of the crest of the at least one pin thread at the end of the at least one pin thread is less than twice the width of the crest of the at least one pin thread at the start of the at least one pin thread.

7. The threaded connection of claim 1, wherein the root width rate is greater than the crest width rate.

8. The threaded connection of claim 1, wherein the pin taper angle is less than the box taper angle.

9. The threaded connection of claim 1, wherein the threaded connection is configured to direct a thread compound towards one end to prevent trapping the thread compound at various points throughout the connection.

10. A threaded pipe connection comprising:
a first pipe comprising at least one pin thread extending in a helical direction around the first pipe along a longitudinal axis from a first pipe front surface towards a first pipe back surface opposite the first pipe front surface, each of the pin threads includes a pin crest width, a pin stab flank and a pin load flank, the pin crest width changes at a pin crest width rate of change; and
a second pipe comprising at least one box thread extending in a helical direction around the second pipe along the longitudinal axis from a second pipe front surface towards a second pipe back surface opposite the second pipe front surface and structured and arranged to connect to the first pipe, each of the box threads includes a box root width, a box stab flank and a box load flank, the box root width changes at a box root width rate of change, wherein the box root width rate of change is different than the pin crest width rate of change;
wherein the pin crest width is greater than the box root width forming a width bias;
wherein the at least one pin thread is tapered at a pin taper angle;
wherein the at least one box thread is tapered at a box taper angle;
wherein the box taper angle is different than the pin taper angle forming a taper angle bias;
the taper angle bias and the width bias are configured to concentrate stress on the pin load flank, box load flank, pin stab flank and the box stab flank, with the stress decreasing along the threaded pipe connection from the first pipe front surface towards the first pipe back surface; and
wherein the taper angle bias and the width bias are configured to orient the first pipe such that a pin thread adjacent the first pipe front surface is first to engage the box threads during rotation for the threaded pipe connection and each subsequent pin thread engages the box threads in an ordered and controlled manner.

11. The threaded pipe of claim 10 wherein the threaded pipe further comprises an opposite end, located opposite the first end;
wherein the opposite end comprises at least one opposite box thread extending in a helical direction around the opposite end along the longitudinal axis from an opposite front surface towards the first end front surface and structured and arranged to connect to the first end;
wherein the at least one opposite box thread is tapered at an opposite box taper angle along a portion of the opposite end between the opposite end front surface and the first end front surface;
wherein the opposite box taper angle is different than the pin taper angle;
wherein a width of the root of the at least one opposite box thread changes at an opposite box root width rate of change along at least a portion of the at least one opposite box thread between a start of the at least one opposite box thread and an end of the at least one opposite box thread; and
wherein the opposite box root width rate of change is different than the pin crest width rate of change.

12. The threaded connection of claim 10, wherein the pin taper angle is at least 2° less than the box taper angle.

13. The threaded connection of claim 10, wherein the pin taper angle is at least 1° less than the box taper angle.

14. The threaded connection of claim 10, wherein the box root width rate of change is at least 10% greater than the pin crest width rate of change.

15. The threaded connection of claim 10, wherein the box root width rate of change is at least 5% greater than the pin crest width rate of change.

16. The threaded connection of claim 10, wherein the width of the crest of the at least one pin thread at the end of the at least one pin thread is less than twice the width of the crest of the at least one pin thread at the start of the at least one pin thread.

17. The threaded connection of claim 10, wherein the root width rate is greater than the crest width rate.

18. The threaded connection of claim 10, wherein the pin taper angle is less than the box taper angle.

19. The threaded connection of claim 10, wherein the threaded connection comprises a metal-to-metal sealing member.

20. A threaded pipe connection comprising:
a first pipe comprising at least one pin thread extending in a helical direction around the first pipe along a longitudinal axis from a first pipe front surface towards a first pipe back surface opposite the first pipe front surface, each of the pin threads includes a pin crest width, a pin stab flank and a pin load flank, the pin crest width changes at a pin crest width rate of change; and
a second pipe comprising at least one box thread extending in a helical direction around the second pipe along the longitudinal axis from a second pipe front surface towards a second pipe back surface opposite the second pipe front surface and structured and arranged to connect to the first pipe, each of the box threads includes a box root width, a box stab flank and a box load flank, the box root width changes at a box root width rate of change, wherein the box root width rate of change is different than the pin crest width rate of change;
wherein the pin crest width is greater than the box root width forming a width bias;
wherein the at least one pin thread is tapered at a pin taper angle;
wherein the at least one box thread is tapered at a box taper angle;
wherein the box taper angle is different than the pin taper angle forming a taper angle bias;
the taper angle bias and the width bias are configured to concentrate stress on the pin load flank, box load flank, pin stab flank and the box stab flank, with the stress decreasing along the threaded pipe connection from the second pipe front surface towards the second pipe back surface; and wherein the taper angle bias and the width bias are configured to orient the first pipe such that a pin thread furthest from the first pipe front surface is first to engage the box threads during the rotation for the threaded pipe connection and each subsequent pin thread engages the box threads in an ordered and controlled manner.

21. The threaded pipe of claim 20 wherein the threaded pipe further comprises an opposite end, located opposite the first end;
  wherein the opposite end comprises at least one opposite pin thread extending in a helical direction around the opposite end along the longitudinal axis from an opposite front surface towards the first end front surface and structured and arranged to connect to the first end;
  wherein the at least one opposite pin thread is tapered at an opposite pin taper angle along a portion of the opposite end between the opposite end front surface and the first end front surface;
  wherein the opposite pin taper angle is different than the box taper angle,
wherein a width of the crest of the at least one opposite pin thread changes at an opposite pin crest width rate of change along at least a portion of the at least one opposite pin thread between a start of the at least one opposite pin thread and an end of the at least one opposite pin thread; and
wherein the opposite pin crest width rate of change is different than the box root width rate of change.

22. The threaded connection of claim 20, wherein the pin taper angle is at least 2° less than the box taper angle.

23. The threaded connection of claim 20, wherein the pin taper angle is at least 1° less than the box taper angle.

24. The threaded connection of claim 20, wherein the box root width rate of change is at least 10% greater than the pin crest width rate of change.

25. The threaded connection of claim 20, wherein the box root width rate of change is at least 5% greater than the pin crest width rate of change.

26. The threaded connection of claim 20, wherein the width of the crest of the at least one pin thread at the end of the pin thread is less than twice the width of the crest of the at least one pin thread at the start of the at least one pin thread.

27. The threaded connection of claim 20, wherein the box root width rate of change is greater than the pin crest width rate of change.

28. The threaded connection of claim 20, wherein the pin taper angle is less than the box taper angle.

29. The threaded connection of claim 20, wherein the threaded connection comprises a metal-to-metal sealing member.

* * * * *